United States Patent [19]

Hallberg

[11] Patent Number: 5,126,049
[45] Date of Patent: Jun. 30, 1992

[54] PROCESS FOR REMOVING NITROGEN COMPOUNDS FROM RAW WATER

[75] Inventor: Rolf O. Hallberg, Tyresö, Sweden

[73] Assignee: Ecocure AB, Sweden

[21] Appl. No.: 582,935

[22] PCT Filed: May 31, 1989

[86] PCT No.: PCT/SE89/00305

§ 371 Date: Nov. 5, 1990

§ 102(e) Date: Nov. 5, 1990

[87] PCT Pub. No.: WO89/12029

PCT Pub. Date: Dec. 14, 1989

[30] Foreign Application Priority Data

Jun. 3, 1988 [SE] Sweden .................. 8802074

[51] Int. Cl.$^5$ .................. C02F 3/30; C02F 1/52
[52] U.S. Cl. .................. 210/605; 210/621; 210/631; 210/903
[58] Field of Search .................. 210/605, 631, 903, 621, 210/622, 630

[56] References Cited

U.S. PATENT DOCUMENTS

| | | | |
|---|---|---|---|
| 3,824,185 | 7/1974 | Caldwell et al. | 210/903 |
| 3,930,998 | 1/1976 | Knopp | 210/903 |
| 4,134,830 | 1/1979 | Skogman et al. | 210/5 |
| 4,732,679 | 3/1988 | Karlsson | 210/605 |
| 4,973,929 | 12/1988 | Kickuth et al. | 210/631 |

OTHER PUBLICATIONS

"Treatment of Waste Water with a High Ammonia Concentration", Chemical Abstracts, vol. 98 (1983), Abstract No. 98:203810k, Votni Hospod., B 1983, 33(3), pp. 77-81, VSCHT, Prague, Czechoslovakia.
Chemical Abstracts, vol. 91 (1979), Abstract No. 91:26832b, Jpn. Kokai Tokyo Koho JP 39 30,661, Ebara-Infilco Company, Ltd.
"Apparatus for Biological Dephosphorization", Abstracts of Japan, 59-59295.

Primary Examiner—Thomas Wyse
Attorney, Agent, or Firm—Lerner, David, Littenberg, Krumholz & Mentlik

[57] ABSTRACT

Processes for the removal of nitrogen compounds from a supply of raw water are disclosed, including an initial denitrification step followed by aeration to release cell-bound nitrogen in the form of ammonium ions from the bacteria produced in the denitrification step without converting the ammonium ions into nitrate or nitrite ions, and precipitating the ammonium ions from the water to produce a substantially nitrogen free supply of water. The precipitation preferably includes treating the water with magnesium and phosphate ions to precipitate the ammonium ions in the form of struvite.

4 Claims, 1 Drawing Sheet

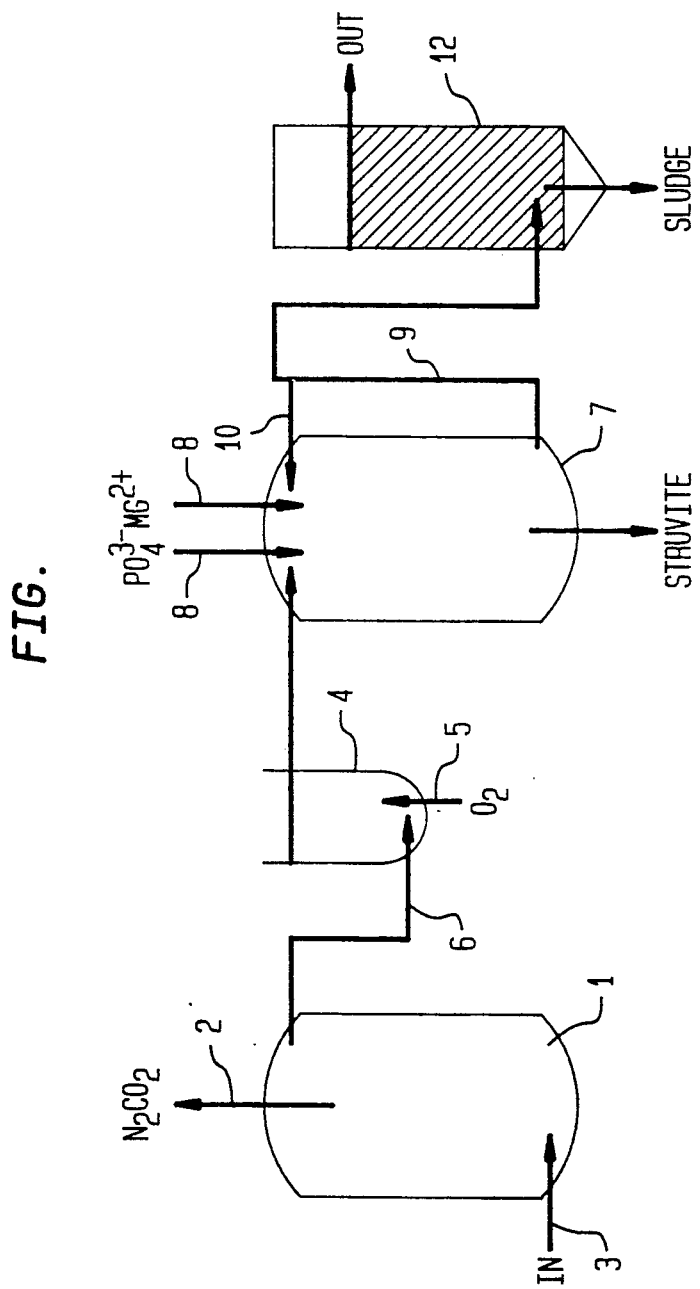

PROCESS FOR REMOVING NITROGEN COMPOUNDS FROM RAW WATER

FIELD OF THE INVENTION

The present invention relates to processes for removing nitrogen compounds dissolved in raw water. More particularly, the present invention relates to processes for removing such nitrogen compounds from raw water by means of microorganisms and chemicals. Still more particularly, the present invention relates to such processes for treating raw water which constitute untreated water from ground water or surface water supplies.

BACKGROUND OF THE INVENTION

Nitrogen exists in nature in both the inorganic and organic form, and is cyclically converted by means of microbes and by chemical redox processes. The organic nitrogen exists in both solid and dissolved forms, as well as in the gas phase, while the inorganic nitrogen exists almost exclusively in the dissolved form or in the gas phase.

In raw water, i.e., untreated water from ground waters or surface water supplies, nitrogen in the form of nitrites is of the greatest interest from the point of view of toxicity. The reason for this is that nitrites block the respiratory mechanism in humans, and therefore any excessive intake leads to choking symptoms, which are particularly critical for infants (i.e., blue babies). Furthermore, nitrates can yield the same problem, since nitrates may easily be converted into nitrites by means of microbes, or by purely chemical reactions, in the human intestinal tract. It is thus important that both nitrates and nitrites be removed from drinking water before it is supplied to the consumer.

Among the types of purification processes which are presently used for removing nitrogen compounds are the following:
(1) ion exchange;
(2) reversed osmosis; and
(3) biological denitrification.

The first two of these processes, however, in most cases require high investment and operating costs, and are therefore less attractive than the biological method. Moreover, ion exchange is not usable in all countries, since toxic components are released from the ion exchange resin. According to the biological process, nitrites and nitrates are converted into nitrogen by means of microbes, and the nitrogen can then be removed, such as by aeration, for example.

Biological denitrification takes place by means of heterotrophic, facultatively anaerobic bacteria. The term "heterotrophic" means that the bacteria require a source of organic carbon as an electron donor and for the synthesis of their own carbon compounds. This carbon source, which may consist of low molecular weight sugars, simple alcohols or organic acids, is thus converted into carbon dioxide by means of oxidation. The term "facultatively anaerobic" means that the bacteria utilize molecular oxygen as an electron acceptor if oxygen is available. However, in the absence of oxygen, the bacteria can then utilize nitrates or nitrites as an electron acceptor. Thus, denitrification processes generally require that the reaction take place in a substantially oxygen-free environment. Not all of the nitrogen will be converted into molecular nitrogen, but a portion thereof will be used for the preparation of organic nitrogen compounds which are necessary for the bacteria themselves.

The bacteria also require phosphates and trace elements for their growth and propagation. Such trace elements are normally present in sufficient amounts for this purpose in the types of water which are to be purified, while phosphates must be added thereto in some cases.

The bacteria active in such denitrification processes usually belong to the genera *Pseudomonas, Bacillus* and *Achromobacter*. Normally the biological denitrification process results in an almost complete removal of nitrates and nitrites. The disadvantage in this process is that these two components are not completely converted into molecular nitrogen, and therefore cannot be completely removed from the system. In addition to the formation of organic nitrogen compounds, it has thus been shown that a bacterial dissimilatory denitrification takes place, leading to the formation of ammonium ions (see Smith, De Laune and Patrick, *Soil. Sci. Soc. Am. J.*, Vol. 46, 1982, pp. 748–750). Ammonium ions may be formed assimilatorily, i.e., the ammonium is absorbed within the cell mass of the bacteria, as well as dissimilatorily, i.e., the ammonium is emitted to the surrounding solution during the metabolism of the bacteria. The organically bound nitrogen will also be gradually emitted to the surrounding solution, normally in the form of ammonium ions, when the bacterium dies and the cell thereof lyses.

In the case of drinking water, the ammonium may be oxidized to nitrites and nitrates before the water has reached the consumer. Thus, the biological denitrification process has not produced the desired result if the ammonium content is too high.

An object of the present invention is to supplement the biological denitrification process with a process step for removing ammonium therefrom. In this manner, all of the nitrogen components can be removed so that they cannot give rise to toxic problems in the drinking water.

SUMMARY OF THE INVENTION

In accordance with the present invention, processes for the removal of nitrogen compounds from a supply of water such as raw water have been developed which include the biological denitrification of a supply of water in the presence of bacteria so as to produce a supply of water having a reduced nitrogen content and bacteria containing cell-bound nitrogen, aeration of the supply of water having reduced nitrogen content so as to release the cell-bound nitrogen in the form of ammonium ions substantially without the conversion of the ammonium ions into nitrate or nitrite ions, and precipitation of ammonium ions from the supply of water so as to produce a substantially nitrogen-free supply of water. In order to remove the ammonium ions in accordance herewith, it is required that they be converted into a solid phase which is sufficiently stable so that it can be removed from the solution by means such as filtration or sedimentation. An example of such a solid phase is the mineral struvite ($MgNH_4PO_4 \cdot 6H_2O$).

In accordance with a preferred embodiment of the process of the present invention, precipitation of the ammonium ions includes treating the supply of water with magnesium ions and phosphate ions so that the ammonium ions are precipitated in the form of struvite. In a preferred embodiment, precipitation of the ammonium ions is carried out in a reactor and includes flowing the supply of water downwardly in the reactor and feeding the magnesium and phosphate ions to the top of the reactor. It is preferred that the precipitation of the ammonium ions also include recirculation of a portion of the substantially nitrogen-free supply of water to the top of the reactor.

In accordance with another embodiment of the process of the present invention, the process includes removing the precipitated struvite from the substantially nitrogen-free supply of water and preferably this is carried out by sedimentation or filtration.

BRIEF DESCRIPTION OF THE FIGURE

In order to more fully understand the subject matter of the present invention, reference is made to the following detailed description, which in turn refers to the FIGURE in which:

FIG. 1 is a schematic representation of a process in accordance with the present invention.

DETAILED DESCRIPTION

The present invention thus relates to processes for removing nitrogen compounds from raw water, in which processes the water is first subjected to a denitrification step. These processes are characterized by the fact that the water produced in the denitrification step is aerated in an aeration step for the purpose of lysing the denitrification bacteria so that the cell-bound nitrogen can be released in the form of ammonium ions. The water can then be treated in a precipitation step with magnesium ions and phosphate ions for the purpose of precipitating the ammonium ions in the form of struvite.

The amounts of magnesium and phosphate ions which must be added in the precipitation step for the formation of struvite are comparatively small, since this mineral has a low solubility product. The formation of struvite also takes place by means of bacteria (see Rivadeneyra et al., *Geomicrobiol. J.*, Vol. 3, No. 2, 1983, pp. 151-163), so that it may be assumed that in a natural medium the process takes place more rapidly and at lower concentrations of the components therein as compared to purely chemical struvite formation. Bacteria which have been shown to have a preference for the formation of extracellular struvite belong to the genera Bacillus, Arthrobacter, Pseudomonas and Azotobacter.

Carrying out this purification process requires at least two reactors, as well as one aeration vessel and usually a filtration or sedimentation tank (see the drawing).

Denitrification itself takes place in the first reactor 1, which is fed through inlet 3. The molecular nitrogen gas formed is removed from the top of the reactor 1 through line 2, either by natural pressure through a water seal or by depression by means of a vacuum pump. If a filler material is used in the reactor 1, this material may consist of sand, leca pellets, plastic beads or the like. The use of such a filler material is not necessary, however. The most important function of the filler material is to create surfaces to which the bacteria can adhere, and upon which they can grow. The water to be treated is forced to flow in vertical direction from inlet 3 at the bottom of reactor 1 upwards. In order to attain optimal conditions for the biological reaction, and added water is adjusted with regard to its content of carbon source for the bacteria. Suitably, alcohol, sugar or organic acid is added thereto. The amount of phosphate in the raw water is normally sufficient, but should nevertheless be supervised while considering the bacterial activity which is desired in the reactor 1. The pH value is adjusted to a value between about 6 and 8, suitably with NaOH.

The next step is an aeration step. The aeration may be performed in a conventional manner in an open vessel 4 by injecting air into the bottom of the vessel 4 through air or oxygen inlet 5. The bacteria from the anaerobic denitrification step are thus subjected to a shock during the aeration, leading to the lysis of the bacteria. The organic nitrogen components are thus released, resulting in an increased ammonium content. The aeration must not be too vigorous, however, since in that case the ammonium ions will be reconverted into nitrites and nitrates. This balance is created by the amount of air added per unit of time and by the size of the vessel, so as to regulate the dwell time of the water. The water should be fed to the bottom of the vessel 4 through inlet line 6.

The formation of struvite takes place in the second reactor 7. The direction of the flow in reactor 7 is opposite to that in the first reactor 1. In order to attain an effective precipitation of ammonium ions in the form of struvite, phosphate and magnesium must be added in suitable proportions. The feed of these chemicals through inlet lines 8 in the top of reactor 7 is based on chemical equilibrium calculations. Phosphate, magnesium and nutrient solutions are thus fed from separate vessels to the top of the reactor 7. Magnesium may be added in the form of $MgCl_2$, $MgSO_4$ or $MgCO_3$, for example, and phosphate may be added in the form of $K_2HPO_4$ or $KH_2PO_4$, for example. The filler material employed in reactor 7 may be of the same type as that used in the first reactor 1, but a portion of the filler material in this case may also consist of a suitable magnesium mineral, such as magnesite or dolomite. In this manner the amount of magnesium solution to be added may be substantially reduced. The water level in reactor 7 may be controlled by regulating the outflow level by means of a hose, for example. A portion of the outflow from exit line 9 is recirculated to the top of the reactor by recirculation line 10, so that viable bacteria in the outflow will be added to and distributed uniformly in the inflow.

In the filtration or sedimentation tank 12, the flow of water is from the bottom upwards. However, in the case of sedimentation, the water is not introduced into the bottom of the tank, but at a suitable distance from the bottom, so that the sedimented particles will not be resuspended. A sedimentation tank may be provided with lamellae for achieving lamella sedimentation. A filtration tank may contain sand as the filtering material. Such sedimentation or filtration of the water is normally necessary before the water can be conveyed to the consumer.

Prior biological processes for removing nitrogen compounds from raw water have not been found to be reliable because far too great a proportion of the nitrogen has remained in the water, e.g., in the form of ammonium compounds. This problem is eliminated by means of the present invention. An optimal precipitation of ammonium in the form of struvite is possible by the special operation of the second reactor with reversed flow and recirculation. Aeration in the second step has been found to effectively kill and spread the bacteria from the first reactor.

Laboratory tests performed with water containing 30 to 40 mg of $NO_3^-$ per liter and have resulted in a minimum amount of dissolved nitrogen compounds in the outflow, viz. <1 mg N per liter of water. This system works better and is more stable at high concentrations of $NO_3^-$, as compared to low concentrations thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A process for the removal of nitrogen compounds from a supply of raw water comprising the biological denitrification of said supply of water in the presence of bacteria so as to produce a supply of water having a reduced nitrogen content and said bacteria containing cell-bound nitrogen, aeration of said supply of water having a reduced nitrogen content so as to release said cell-bound nitrogen in the form of ammonium ions substantially without the conversion of said ammonium ions into nitrate or nitrite ions, and precipitation of said ammonium ions from said supply of water in the form of struvite by treating said supply of water with magnesium ions and phosphate ions in a reactor and recirculating at least a portion of said substantially nitrogen-free supply of water withdrawn from said reactor back to said reactor whereby viable bacteria in said substantially nitrogen-free supply of water are added back to said reactor so as to produce a substantially nitrogen-free supply of water.

2. The process of claim 1 wherein said precipitation of said ammonium ions is carried out in a reactor and includes flowing said supply of water downwardly in said reactor and feeding said magnesium ions and phosphate ions to the top of said reactor.

3. The process of claim 2 including removing said precipitated struvite from said substantially nitrogen-free supply of water.

4. The process of claim 3 wherein said removing of said struvite from said substantially nitrogen-free supply of water is carried out by sedimentation or filtration.

* * * * *

UNITED STATES PATENT AND TRADEMARK OFFICE
CERTIFICATE OF CORRECTION

PATENT NO.   :   5,126,049
DATED        :   June 30, 1992
INVENTOR(S)  :   Rolf O. Hallberg It is certified that error appears in the above-identified patent and that said Letters Patent is hereby corrected as shown below:

Column 6, line 16, delete "2" and insert therefor --1--.

Signed and Sealed this

Thirty-first Day of August, 1993

Attest:

BRUCE LEHMAN

*Attesting Officer*         *Commissioner of Patents and Trademarks*